W. W. BIRNSTOCK.
FERTILIZER DISTRIBUTER.
APPLICATION FILED NOV. 16, 1916.
1,218,361.
Patented Mar. 6, 1917.
4 SHEETS—SHEET 4.
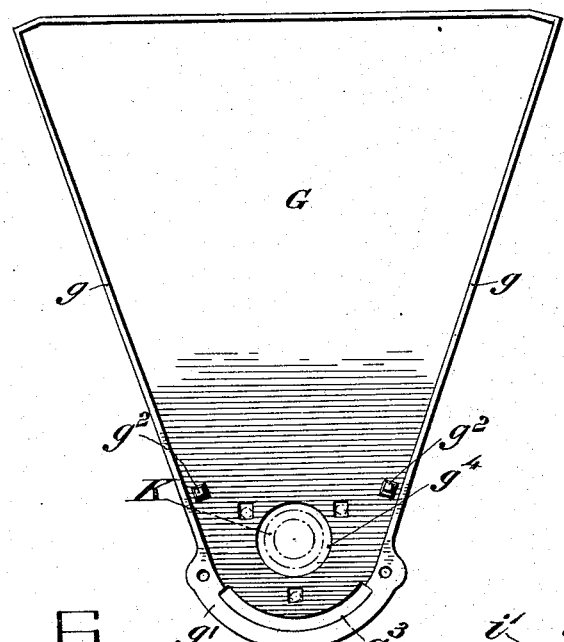
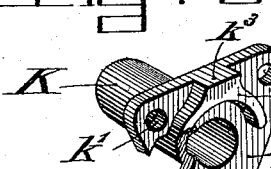
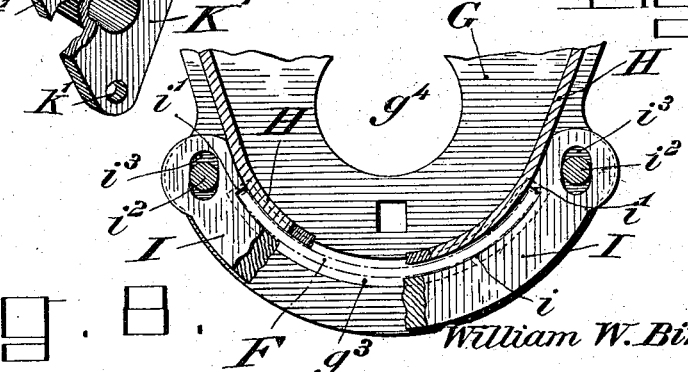
Witness
Harry King.
H. B. Marston.
Inventor
William W. Birnstock
By MacAllen Bailey
his Attorney

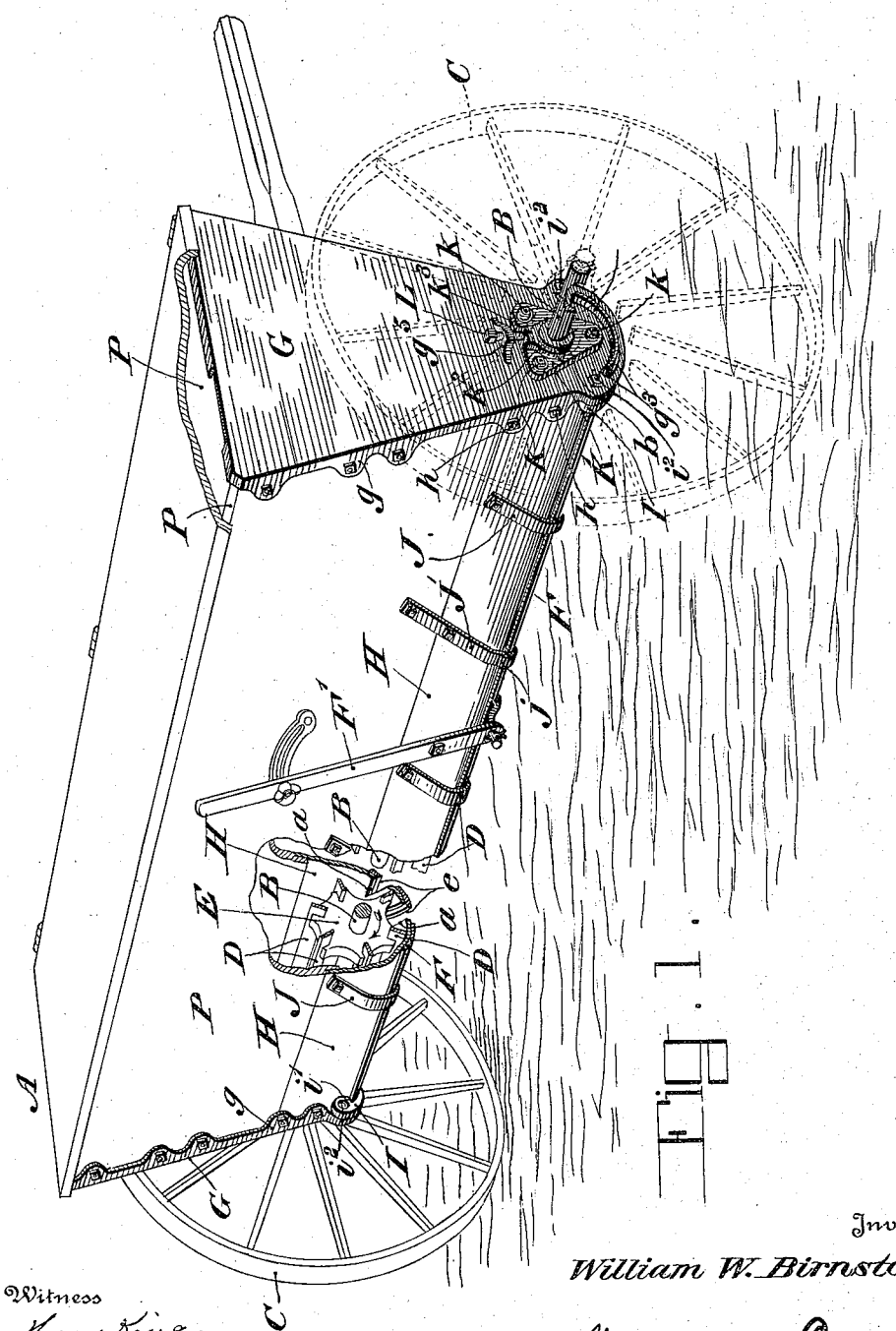

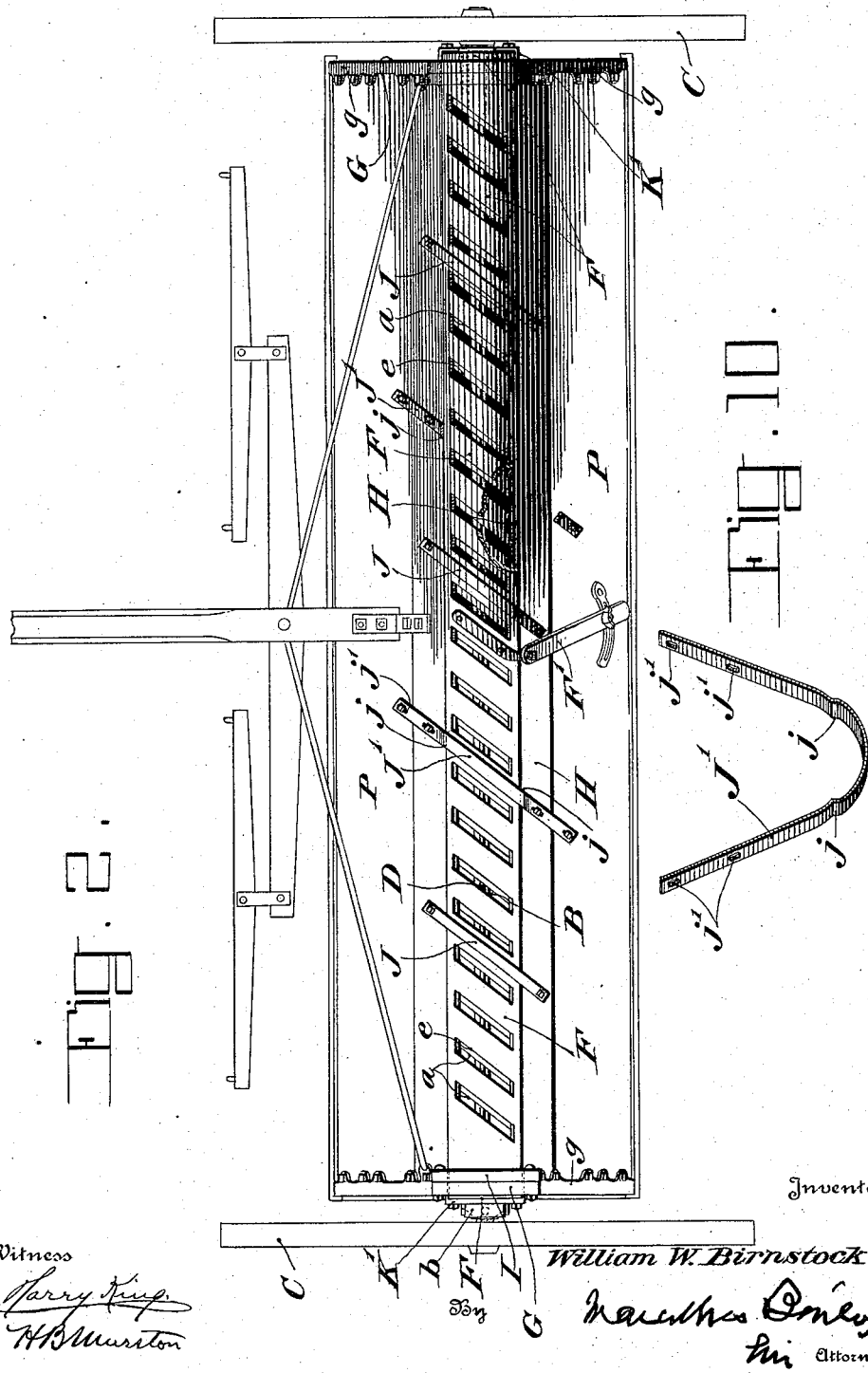

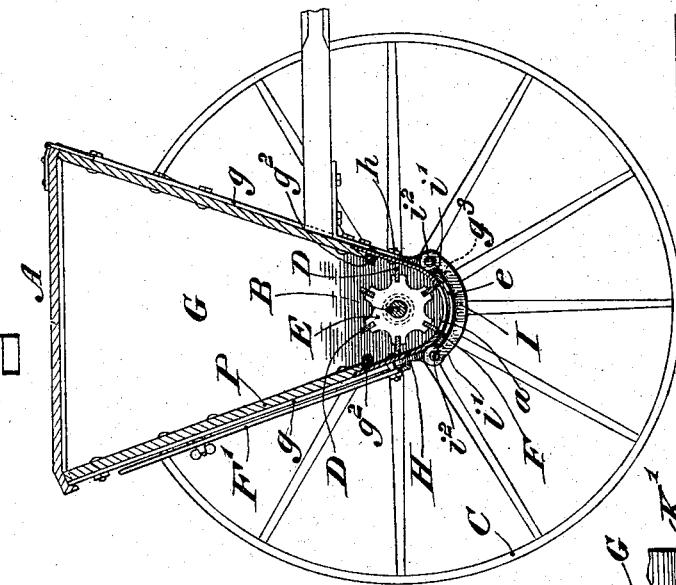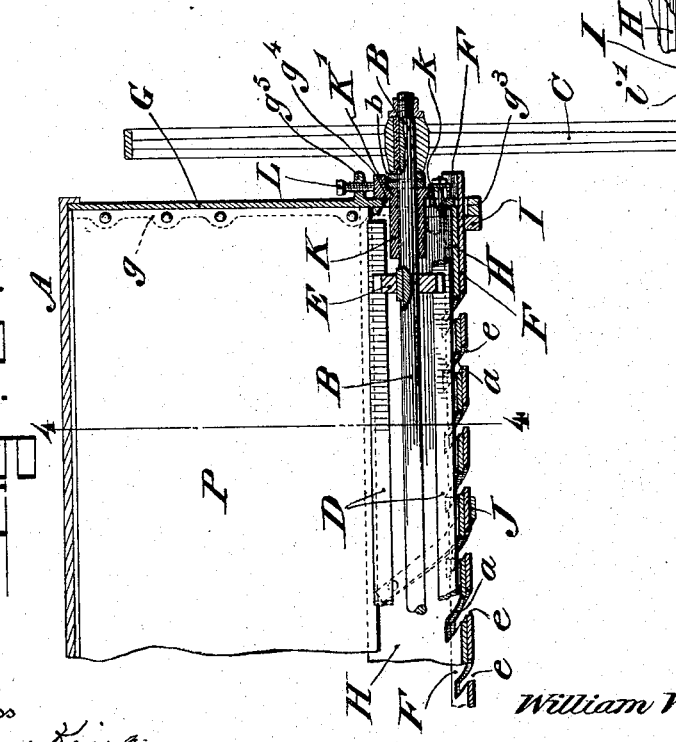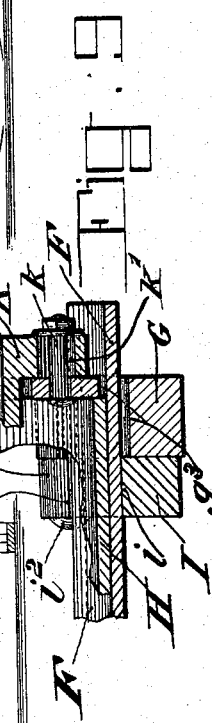

UNITED STATES PATENT OFFICE.

WILLIAM W. BIRNSTOCK, OF YORK, PENNSYLVANIA, ASSIGNOR TO HENCH & DROMGOLD COMPANY, OF YORK, PENNSYLVANIA.

FERTILIZER-DISTRIBUTER.

1,218,361.      Specification of Letters Patent.      Patented Mar. 6, 1917.

Application filed November 16, 1916. Serial No. 131,758.

*To all whom it may concern:*

Be it known that I, WILLIAM W. BIRNSTOCK, of the city of York, in the county of York and State of Pennsylvania, have invented certain new and useful Improvements in Fertilizer-Distributers, of which the following is a specification.

My invention relates to a fertilizer distributer of the kind which is the subject of U. S. Letters Patent No. 1,155,204 granted to me on September 28, 1915; and it consists in certain improvements in the construction and arrangement of the feed hopper of that fertilizer distributer and parts immediately associated therewith, with a view to enhance the stability and efficiency of that portion of the machine, which improvements will first be described by me in connection with the accompanying drawings, forming part of this specification, and will then be more particularly pointed out in the claims.

In the drawings—

Figure 1 is a perspective view, from the rear, of a fertilizer distributer embodying my invention showing the external face of one of the cast iron end plates of the hopper. I omit from the drawing, as unnecessary to an understanding of my present improvements, the representation of the clutch mechanism preferably employed to connect the agitator shaft (which is also the axle) with the supporting wheels of the machine. And the wheel on the right of the hopper is represented in dotted lines in order not to obscure the part of the hopper which more immediately concerns my invention.

Fig. 2 is a bottom view of the machine.

Fig. 3 is a vertical longitudinal section of the hopper for a portion of its length.

Fig. 4 is a cross-section of the hopper on line 4—4, Fig. 3.

Fig. 5 is a view of the inside face of one of the end-plates of the hopper, the outer face of which is shown in Fig. 1.

Fig. 6 is a detached view of one of the adjustable bearings for the agitator shaft.

Fig. 7 is a detached view of one of the end bearing straps for the sliding feed gate.

Fig. 8 is an enlarged view of the lower part of the hopper-end-plate Fig. 5, showing the bearing strap I in place, partly broken away to expose the slot $g^3$ and the ends in section to show the means for adjustably securing the strap in place.

Fig. 9 is a section in the same plane as in Fig. 3 of the lower portion of the hopper and related parts at or near one of the hopper-end-plates, but on much enlarged scale to exhibit more clearly the construction.

Fig. 10 is an enlarged view of one of the intermediate U-shaped bearing straps for the sliding feed gate.

In the drawings, A represents the hopper; B the axle constituting also the driving shaft for the agitator; C the wheels from which motion is imparted to B; D the agitator bars extending lengthwise of the hopper; E the spiders by which said bars are mounted on and attached to the shaft B. The bottom of the hopper is curved transversely of its length in the arc of a circle struck from the axis of shaft B as a center, and the agitator bars sweep over this curved bottom in a path concentric thereto and in close proximity therewith; $a$ are the rhomboidal discharge openings in the curved bottom; F is the feed gate with rhomboidal openings $e$ similar to the openings $a$, adapted to slide lengthwise of the hopper to vary the dimensions of the feed openings; F' is the latched lever for operating the sliding feed gate. Thus far there is nothing new in the machine; the parts so far named are identified by the same reference characters and are combined and arranged together for joint operation in the same way as in my aforesaid Letters Patent No. 1,155,204.

The ends of the hopper consist of cast iron plates G, one for each end, the counterparts of one another, so that a description of one will answer for both. The plate is of approximately triangular form, widest at the top, with its side edges gradually converging toward the bottom. The plate is bordered by a flange $g$ which projects from and at right angles to the inner face of the plate and extends practically continuously from the top of one edge of the plate down along that edge to the bottom, where it follows a curved path over to the other edge of the plate, along which it extends up to the top of the plate, the curvature of the bottom portion of the flange being that designed for the curved bottom of the hopper. The flange, as stated, is practically continuous; or in other words, it is continuous save for a space $g'$ at the bottom, which in length is coextensive with the width of the feed gate F, from which space the flange is omitted, as indicated more plainly in Figs. 5, 8. The curved portion of the hopper bottom is seated in the curved lower portion of the flange $g$, and the portion of the latter at $g'$ is omitted in order to allow the feed gate to fit up into this portion from which the flange has been omitted so as to meet and be close against that portion of the curved hopper bottom in which the feed openings $a$ are located. The circular curvature of the lower portion of the flange $g$ is that of an arc of a little less than 180 degrees struck from the axis of the agitator shaft B as a center. The bottom of the hopper consists of a plate H of malleable sheet steel extending the length of the hopper and curved along its middle line transversely of its length to seat itself at each end upon and against the curved portion of the flange $g$ of the adjacent end piece G, with diverging straight side portions above its curved portion to fit against the inner faces of the straight portions of the flange $g$. This sheet steel bottom is secured to the flange at its upper extremities by bolts $h$, as shown more clearly in Fig. 4, and above it the front and rear sides of the hopper are continued to the top by wooden panels P fitted between the cast iron ends G and bolted to the flange $g$ thereof and recessed along their lower edges which meet and overlap the horizontal top edges of the steel bottom H in order to form a flush external joint with said plate as shown, the bottom edges of the panels resting on lugs $g^2$ on the inner faces of the cast iron ends G.

The rhomboidal feed openings $a$ in the bottom H are formed and arranged as in my aforesaid Patent No. 1,155,204, the flange $g$ in each cast iron end G being omitted for this portion of the bottom as hereinbefore stated.

In that portion of each cast iron end plate G from which the flange $g$ is omitted is a curved slot $g^3$ having the curvature of the bottom. These slots $g^3$ are designed for the passage of the ends of the curved sliding feed gate F. They are of a length not less than, and roughly equaling, the width of the end portions of the feed gate which extend through them, and of a width approximately equaling the combined thickness of the metallic hopper bottom H and feed gate F; and they are so located as to extend along their upper edge into the space $g'$, from which the flange $g$ is omitted, so that the hopper bottom for a portion of its thickness may extend far enough below the upper edge of said feed slots to allow the externally applied feed gate to fit closely against it throughout its length, as shown in Figs. 3, 9.

To provide accurate and close fitting bearings in which the ends of the feed gate may slide, I apply to the inner face of each of the cast iron hopper-end-plates G, in proximity to the slot $g^3$ therein, a stout strap I, preferably of steel, having an upper face which borders the lower edge of the slot $i$, which borders the lower edge of the slot $g^3$, and is of concave curvature corresponding to the curvature of the convex face of the sliding feed gate, and which is designed to furnish a bearing on which the end of the gate rests and can slide, there being shoulders $i'$ at the ends of the curved bearing face $i$ at such distance apart as to receive the feed gate snugly between them, and thus to restrain it from all movement other than the longitudinal sliding movement which it must have for feed regulating purposes. The bearing strap I is preferably adjustably secured to its hopper-end-plate G, this being provided for in the present instance by attaching it to its hopper-end-plate by means of bolts $i^2$, passing through vertically elongated holes $i^3$ in the bearing strap which will permit said strap to be pushed up against the feed gate so as to seat the latter snugly against the hopper bottom H and the line of oblong feed openings therein, and then to be secured in this adjusted position by tightening the bolts $i^2$. The close fit of the bearing strap against the portion of the feed gate which slides on it necessarily wears the bearing face $i$, and the vertical adjustability of the bearing strap is designed to provide a means for compensating for this wear, thus permitting the bearing face $i$ to be maintained in its appropriate position with relation to the feed gate.

The feed gate at points between its ends is further supported by straps J which pass under it and the hopper bottom and have their ends secured to the sides of the hopper as shown, these straps extending across the feed gate F in the intervals between the slanting rhomboidal shaped openings $e$ therein, and at an inclination corresponding to the slant of said openings as indicated more particularly in Fig. 2. These intermediate U-shaped bearing straps—as many of them as desired—may be, and preferably are, offset for that curved portion of their length which extends across the feed gate, to provide a seat for said gate bounded by shoulders $j$ between which the longer edges of the gate are received and snugly fit, thus providing guides for the gate in its lengthwise movement, and also permitting the strap to fit closely against both the gate and the hopper bottom and sides beyond the longer edges of the gate. Two of such straps, lettered J' to distinguish them from the other and shorter straps J, are shown in Fig. 2 as thus formed. The straps J—as many or as few as desired—may have the same offset formation.

I have represented one of the straps J' in perspective in Fig. 10, the holes $j'$ therein for the passage of the bolts by which it is secured to the hopper being elongated as shown to permit it to be properly adjusted and fitted in place.

A further requisite to insuring efficient feed action is that the agitator must be positioned with precision so that its agitator bars D will sweep accurately and evenly over the curved portion of the bottom H where the feed openings $a$ are located, in that close proximity thereto requisite to produce, in connection with the slanting longer edges of the feed openings, the shearing action indispensable to the even delivery of the material in quantity controlled by the feed gate.

To this end the ends of the combined axle and agitator shaft B are supported in adjustable bearings in the cast iron hopper ends G, each bearing consisting of a spool or hub K through which the end of the shaft B passes, and a plate K' of triangular form cast in one with the hub and adapted to be adjustably secured to the hopper-end G.

The bearing plate K' is applied to and secured upon the exterior face of the hopper-end G, and the hub projects through a hole $g^4$ formed in the latter so as to extend through the hopper-end into the interior of the hopper far enough to form an adequate bearing for the agitator shaft. The bearing plate K' is secured to the hopper-end by bolts $k$, and the bolt holes $k'$ in the bearing plate, as well as the hole $g^4$ in the hopper-end, are sufficiently larger than the bolts $k$ and the hub K which pass through them respectively to allow the plate all the movement needed to permit the accurate adjustment of the agitator shaft and agitator bars which it carries to the curved hopper bottom. Upon the exterior of the bearing plate K', and concentric with the hub or spool K, is a sand band $k^2$ which overhangs and partially encircles a collar $b$ on the end of the shaft B which projects beyond the bearing plate. The middle portion $k^3$ of this sand band is thickened and has a flat top as shown; and directly above this thickened portion $k^3$ is an overhanging lug $g^5$ on the cast iron hopper-end G, screw-threaded for the passage of a correspondingly threaded vertical set screw L, the lower end of which is screwed down upon the seat provided by the flat upper face of the part $k^3$ on the bearing plate K'. The vertical set screw L is in the vertical plane of the axis of the agitator shaft B, and thus the set screw presses on its seat $k^3$ on the bearing plate K' at a point directly over the axis of the spool or hub K, and between the upper end bolts $k$.

To adjust the bearing plate, the bolts $k$ are loosened sufficiently to permit the movement of the plate needed to effect the adjustment, after which the bolts are tightened to hold the plate in its adjusted position, and the set screw L is screwed down tightly upon its seat $k^3$ on the bearing plate to still further assure the plate in its adjusted position and particularly to prevent any lifting movement of the bearing plate calculated to disturb the relations of the agitator bars with the portion of the curved hopper bottom in which the feed openings $a$ are located.

The capacity for the close and accurate adjustment of the agitator bars with reference to the hopper bottom, not only insures efficient regulable feed action, but prevents the "bridging" and clogging action of the material and thus renders the machine self-cleaning as well.

Having described my improvements and the best way now known to me of carrying the same into practical effect, what I claim herein as new and desire to secure by Letters Patent, is as follows:

1. In a fertilizer distributer of the character described, cast metal hopper-end-plates the sides and bottom of which are bordered by a flange curved as to its bottom portion to conform to the convexity of the hopper bottom, in combination with a metallic hopper bottom curved transversely of its length, fitted and secured in place in the seat provided by said flange and formed with feed openings, the flanged seat being omitted on the hopper-end-plates for that portion of the width of the hopper bottom wherein the feed openings are located, a sliding feed gate provided with corresponding openings, and applied to and fitted against the exterior of that portion of the curved bottom where the flanged seat is omitted, and end bearings for said sliding gate secured to the hopper end plates and adapted to hold the gate in close contact with the hopper bottom, substantially as and for the purposes hereinbefore set forth.

2. In a fertilizer distributer of the character described, cast metal hopper-end-plates the sides and bottom of which are bordered by a flange curved as to its bottom portion to conform to the convexity of the hopper bottom, in combination with a metallic hopper bottom curved transversely of its length, fitting and secured in place in the seat provided by said flange and provided with feed openings, the flanged seat being omitted on the hopper-end-plates for that portion of the width of the hopper bottom wherein the feed openings are located, a sliding feed gate provided with corresponding openings fitted against that portion of the curved bottom where the flanged seat is omitted, so that it may be brought up against said bottom, and bearings for said gate adjustably secured to the hopper-end-plates, substantially as and for the purposes hereinbefore set forth.

3. In a fertilizer distributer of the character described, cast metal hopper-end-plates, the sides and bottom of which are bordered by a flange curved as to its bottom portion to conform to the convexity of the hopper bottom, in combination with a metallic hopper bottom curved transversely of its length, fitted and secured in the seat provided by said flange, and formed with feed openings, the flanged seat being omitted on hopper-end-plates for that portion of the width of the bottom wherein the feed openings are located, and a slot of curvature corresponding to that of the bottom being formed in said portion of said hopper-end-plates; a sliding feed gate provided with corresponding openings, and applied to and fitted against the exterior of that portion of the bottom wherein the feed openings are formed, the ends of the feed gate projecting through the curved slots in the hopper-end-plates; and end bearing straps secured to the hopper-end-plates in proximity to the curved slots therein and adapted to support and hold the feed gate in close contact with the hopper bottom, substantially as and for the purposes hereinbefore set forth.

4. In a fertilizer distributer of the character described, a hopper having a metallic bottom curved transversely of its length and provided with feed openings in combination with a correspondingly curved feed gate fitted to and adapted to slide lengthwise upon the exterior of the hopper bottom and having openings adapted to register with those in the hopper bottom, and bearing straps for the ends of the feed gate formed with curved bearing faces on which the ends of the feed gate rest and can slide and shoulders between which the longer edges of the feed gate fit and by which the feed gate is restrained from other than longitudinal sliding movement, said bearing straps being secured to and vertically adjustable on the hopper-end-plates, substantially as and for the purposes hereinbefore set forth.

5. In a fertilizer distributer of the character described, the combination with the hopper-end-plates, and the curved bottom formed with feed openings, and extending between and secured to said end plates; of bearing plates located upon the exterior opposite faces of the hopper-end-plates and provided upon their interior opposite faces with tubular spools or hubs the bore of which opens outwardly through the bearing plates, said spools or hubs extending through openings of relatively greater diameter in the hopper-end-plates into the interior of the hopper; an agitator shaft the ends of which pass through and are supported and take their bearing in said hubs; and means for adjustably securing the bearing plates to the hopper-end-plates to permit the bearing spools or hubs which project through the end plates into the interior of the hopper to be positioned in the larger openings in the end plates through which they pass to obtain the accurate adjustment, with reference to the curved hopper bottom, of the agitator shaft carried by and supported in them, substantially as and for the purposes hereinbefore set forth.

6. In a fertilizer distributer of the character described, the combination with the hopper-end-plates, curved hopper bottom, and agitator shaft, of castings each comprising a bearing plate adapted to be adjustably secured to its hopper-end-plate and a bearing spool or hub projecting from the inner face of said plate through the hopper-end-plate into the interior of the hopper to provide a bearing for the agitator shaft, a sand band on the exterior of the bearing plate overhanging and concentrically arranged with reference to the bore of the bearing spool or hub and formed with a seat located vertically over the axis of the bore, an internally screw threaded lug on the exterior face of the hopper-end-plate directly over the seat on the sand band, and a set screw passing down through the screw threaded lug and adapted to bear at its lower end against the seat on the sand band, substantially as and for the purposes hereinbefore set forth.

7. In a fertilizer distributer of the character described, a hopper having a metallic bottom curved transversely of its length and provided with feed openings; in combination with a correspondingly curved feed gate fitted to and adapted to slide lengthwise upon the exterior of the hopper bottom and having openings adapted to register with those in the hopper bottom; end bearing and guide straps for the ends of the sliding feed gate secured to and vertically adjustable on the hopper-end-plates; and intermediate U-shaped bearing straps for the sliding feed gate secured by their legs to the hopper sides, and offset for that curved portion of their length which extends across the feed gate to provide a seat for said gate bounded by guide shoulders $j$ between which the longer edges of the gate are received and snugly fit, substantially as and for the purposes hereinbefore set forth.

In testimony whereof I affix my signature.

WILLIAM W. BIRNSTOCK.

Copies of this patent may be obtained for five cents each, by addressing the "Commissioner of Patents, Washington, D. C."